Feb. 24, 1959     B. E. LÖFGREN     2,874,999
APPARATUS FOR PNEUMATIC TRANSPORT OF GRANULAR MATERIAL
Filed March 6, 1956
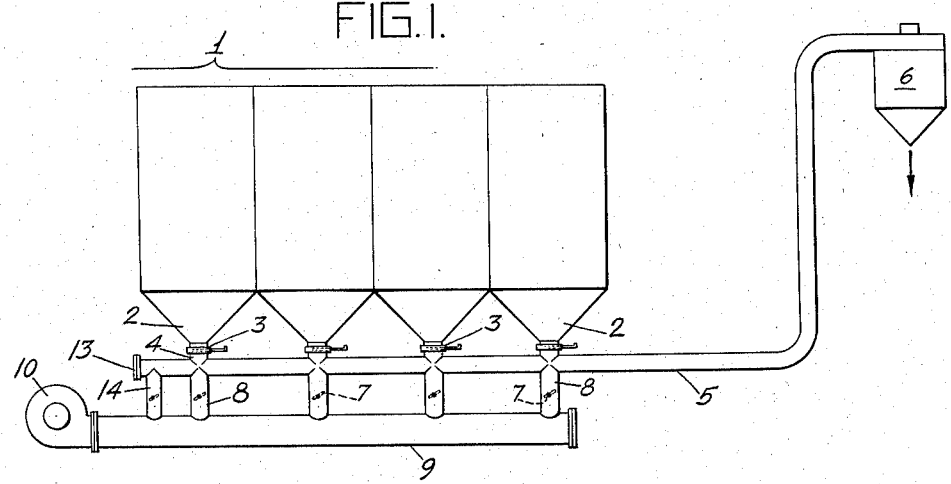
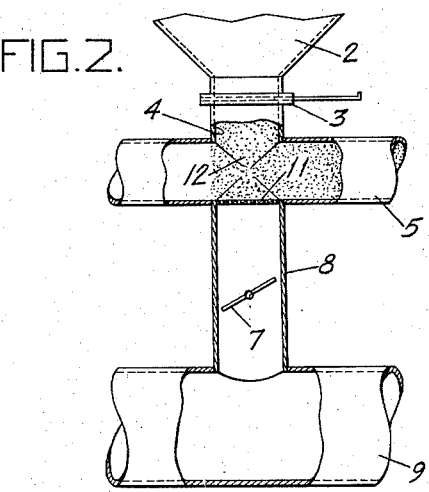
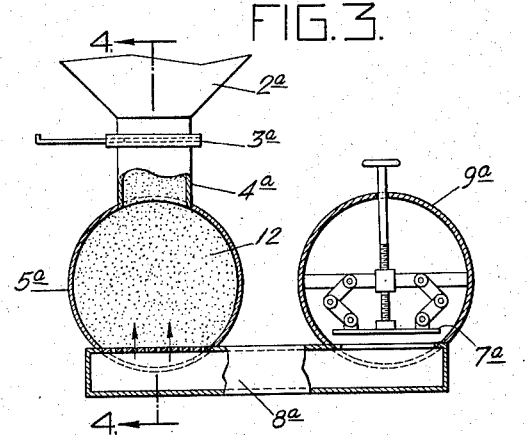
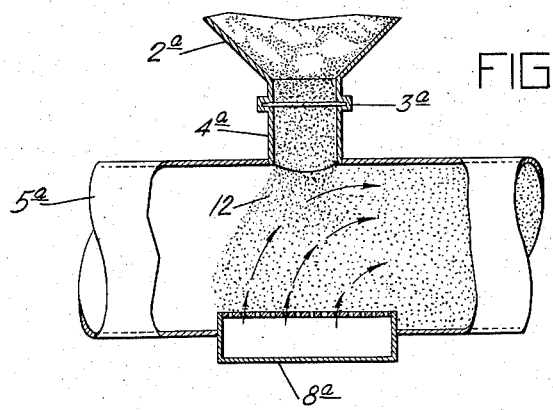
INVENTOR:
BROR E. LÖFGREN
BY Howson & Howson
ATTYS.

United States Patent Office 2,874,999
Patented Feb. 24, 1959

2,874,999

APPARATUS FOR PNEUMATIC TRANSPORT OF GRANULAR MATERIAL

Bror E. Löfgren, Stockholm, Sweden, assignor to Aktiebolaget Svenska Flaktfabriken, Stockholm, Sweden Application March 6, 1956, Serial No. 569,916

Claims priority, application Sweden March 8, 1955

4 Claims. (Cl. 302—27)

The present invention relates to an apparatus for pneumatic transport of granular material in accordance with the so called fluidizing principle.

In order to eliminate the need for great quantities of air and rather wide transport pipes, which are common in pneumatic transport of prior known kind, the so called fluidizing principle has lately been used. According to this principle material is fed into a closed container, at the bottom of which air is supplied under rather high pressure, resulting in a fluidization of the material, i. e., the material is caused to behave like a liquid. By the prevailing pressure the material can be caused to flow like a liquid through a pipe line of very small dimension and thus in a suitable manner be transported to any desired space. The use of such a transport method for, for instance, grain, when discharging silos and similar great containers would from several points of view be valuable, but the method has owing to practical difficulties hitherto not been realizable. Such containers of conventional construction do not stand against the high pressure, which must be given to the supplied air for the fluidization of the material and a reinforcing of the containers would—where possible—be too expensive. A transferring of the contents of the silo intermittently to a smaller container being constructed for high pressure would involve an extra working operation, which would eliminate the features of this transporting system and the necessary space for such an extra arrangement is further often not available. It is an object of the invention to make this new transport method realizable also in plants of the above mentioned kind.

The apparatus according to the invention consists of a transport pipe with one or more shutable inlet openings for the material and in known manner connected to a device for the separating of the material and a distributing pipe connected with said transport pipe, said distributing pipe being attached to means for the supply of a gaseous transporting medium.

It is a main characteristic of the apparatus that the connection between the transport and distributing pipes consists of branch pipes arranged straight in front of each of the inlet openings for the material, which branch pipes are connected to the underside of the transport pipe and in that the orifices of said pipes at the transport pipe are covered by an air-permeable plate or the like.

The apparatus can—for instance where the height of the available space is limited—preferably be designed in such a manner, that the transport and distributing pipes run parallelly and in one and the same horizontal plane and by means of openings in the bottom of the pipes communicate with one another via the branch pipes.

The invention will now be described more in detail with reference to the accompanying drawing, illustrating an exemplifying embodiment of the invention and where, Fig. 1 shows apparatus made in accordance with the present invention in side elevation with the transport and distributing pipes arranged in vertically spaced relation;

Fig. 2 is a sectional view taken on the line 2—2 of Fig. 1;

Fig. 3 shows in cross section apparatus made in accordance with the invention with the transport and distributing pipes arranged in spaced horizontal relation; and, Fig. 4 is a sectional view taken on the line 4—4 of Fig. 3.

In Figs. 1 and 2 of the drawing 1 designates a number of containers (silos), the bottom discharge openings 2 of which are connected to inlet openings 4 of a transport pipe 5, said openings being equipped with shutable valves 3. The transport pipe is connected to a device 6 of known design for the separation of the material from the transporting medium. Straight in front of each inlet opening 4 the transport pipe is connected with a distributing pipe 9 by means of branch pipe 8, equipped with dampers 7, said distributing pipes being connected to means 10 (a ventilator) for the supply of a gaseous transporting medium. Over the orifices of said branch pipes at the transport pipe there is arranged an air-permeable plate 11, which in the shown embodiment consists of a perforated sheet iron plate and which plate according to the size of the material can be made of wire gauze, felt or similar material. By said plate the supplied transporting medium will be distributed through the material 12 flowing down into the transport pipe, the material thus being fluidized. In order to facilitate the cleaning of the transport and distributing pipes, when necessary, the free ends of said pipes are provided with detachable end plates 13, and for the purpose of cleaning the transport pipe by forcing an air current through the pipe, this is suitably connected with the distributing pipe by means of an additional branch pipe 14, being equipped with a damper.

In Figs. 3 and 4 similar reference numerals followed by the character a have been applied to the corresponding parts of the apparatus. This form of the invention operates identically to the form shown in Figs. 1 and 2.

The structural design and the mutual location of the details can be varied within the scope of the invention.

I claim:

1. Apparatus for pneumatic transport of granular material in accordance with the so-called fluidizing principle comprising a transport pipe, a plurality of inlet openings in said transport pipe for introducing the granular material thereinto, means to shut off each of said inlet openings, and means to introduce a gaseous transport medium into said transport pipe including distributing pipe mounted alongside said transport pipe, a branch pipe for each inlet opening connected to said distributing pipe and opening into said transport pipe through an orifice opposite said inlet opening, and an air-permeable plate covering each orifice, whereby said gaseous medium fluidizes the material after it is introduced into said transport pipe, and a separating device connected to said transport pipe to receive the fluidized material and separate the granular material from the gaseous medium.

2. Apparatus according to claim 1 wherein said transport pipe is substantially horizontal, said inlet openings are formed in the top portion of the transport pipe and said orifices are formed in the bottom portion of the transport pipe, and wherein further said transport pipe and distributing pipe are disposed parallel to each other.

3. Apparatus according to claim 2 wherein said transport pipe and distributing pipe are disposed in the same vertical plane and said branch pipes are disposed vertically therebetween in said plane and are connected to said transport pipe through said orifices in the bottom portion thereof and to said distributing pipe in the top portion thereof.

4. Apparatus according to claim 2 wherein said transport pipe and distributing pipe are disposed in the same horizontal plane and said branch pipes are disposed horizontally therebelow and are connected to said transport pipe through said orifices in the bottom portion, and to said distributing pipe in the bottom portion thereof.

References Cited in the file of this patent

UNITED STATES PATENTS

| | | |
|---|---|---|
| 1,893,505 | Nungesser | Jan. 10, 1933 |
| 2,221,741 | Vogel-Jorgensen | Nov. 12, 1940 |
| 2,325,432 | Simpson | July 27, 1943 |
| 2,625,442 | Kollgaard | Jan. 13, 1953 |
| 2,674,497 | Thayer | Apr. 6, 1954 |
| 2,735,725 | Galle | Feb. 21, 1956 |
| 2,793,914 | Gardeniers | May 28, 1957 |

FOREIGN PATENTS

| | | |
|---|---|---|
| 1,074,419 | France | Mar. 31, 1954 |